US012623364B2

(12) United States Patent
Son et al.

(10) Patent No.: US 12,623,364 B2
(45) **Date of Patent: *May 12, 2026**

(54) HANDLE ASSEMBLY AND CARTRIDGE, AND RAZOR INCLUDING SAME

(71) Applicant: DORCO CO., LTD., Seoul (KR)

(72) Inventors: Sung Hee Son, Seoul (KR); Jae Joon Lee, Seoul (KR)

(73) Assignee: Dorco Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/774,719

(22) Filed: Jul. 16, 2024

(65) Prior Publication Data

US 2024/0367331 A1 Nov. 7, 2024

Related U.S. Application Data

(63) Continuation of application No. 18/057,686, filed on Nov. 21, 2022, now Pat. No. 12,070,868, which is a (Continued)

(30) Foreign Application Priority Data

Nov. 20, 2015 (KR) ........................ 10-2015-0162937

(51) Int. Cl.
*B26B 21/14* (2006.01)
*B26B 21/08* (2006.01)
(Continued)

(52) U.S. Cl.
CPC .......... *B26B 21/14* (2013.01); *B26B 21/4012* (2013.01); *B26B 21/4018* (2013.01);
(Continued)

(58) Field of Classification Search
CPC ............ B26B 21/4018; B26B 21/4012; B26B 21/4031; B26B 21/521; B26B 21/225; B26B 21/14; B26B 21/443; B26B 21/522
(Continued)

(56) References Cited

U.S. PATENT DOCUMENTS 4,492,024 A * 1/1985 Jacobson .............. B26B 21/227 30/50
5,010,646 A * 4/1991 Neamtu ................ B26B 21/227 30/41
(Continued)

FOREIGN PATENT DOCUMENTS

CN 104884212 A 9/2015
EP 1844910 A 10/2007
(Continued)

OTHER PUBLICATIONS

State Intellectual Property Office of the People's Republic of China Application Serial No. 201580084736.4 Office Action dated Apr. 18, 2019, in 5 pages.
(Continued)

*Primary Examiner* — Laura M Lee
(74) *Attorney, Agent, or Firm* — Knobbe Martens Olson & Bear LLP

(57) ABSTRACT

A cartridge may include at least one blade, and a frame supporting the at least one blade to expose the at least one blade at a front and configured to receive the at least one blade in a longitudinal direction. The cartridge may also include a first guard member disposed in front of the at least one blade and configured to align hair entering the at least one blade, and a second guard member disposed in front of the first guard member. The cartridge may further include an opening formed between the first and second guard members and configured to penetrate the frame in a direction from the front to a rear. A width of the opening in a lateral direction
(Continued)

perpendicular to the longitudinal direction may be greater than a half of a width in a lateral direction defined by all of the at least one blade.

11 Claims, 7 Drawing Sheets

Related U.S. Application Data continuation of application No. 15/983,677, filed on May 18, 2018, now Pat. No. 11,504,865, which is a continuation of application No. PCT/KR2015/012521, filed on Nov. 20, 2015.

(51) Int. Cl.
*B26B 21/22* (2006.01)
*B26B 21/40* (2006.01)
*B26B 21/52* (2006.01)

(52) U.S. Cl.
CPC ............. *B26B 21/08* (2013.01); *B26B 21/225* (2013.01); *B26B 21/52* (2013.01); *B26B 21/521* (2013.01)

(58) Field of Classification Search
USPC .............................................. 30/50, 77, 74.1
See application file for complete search history.

(56) References Cited

U.S. PATENT DOCUMENTS 5,063,667 A * 11/1991 Jacobson ............ B26B 21/4018 30/41
5,224,267 A 7/1993 Simms et al.
5,687,485 A 11/1997 Shurtleff et al.
5,761,814 A 6/1998 Anderson et al.
5,787,586 A 8/1998 Apprille, Jr. et al.
5,956,848 A 9/1999 Tseng et al.
5,956,851 A 9/1999 Apprille et al.
6,029,354 A 2/2000 Apprille et al.
6,041,926 A 3/2000 Petricca et al.
6,052,903 A 4/2000 Metcalf et al.
6,161,287 A * 12/2000 Swanson ............. B26B 21/4068 30/47
6,185,822 B1 2/2001 Tseng et al.
6,212,777 B1 4/2001 Gilder et al.
6,243,951 B1 6/2001 Oldroyd
6,434,839 B1 8/2002 Lee et al.
6,442,839 B1 9/2002 Tseng et al.
6,516,518 B1 2/2003 Garraway et al.
6,612,040 B2 9/2003 Gilder
6,684,513 B1 2/2004 Clipstone et al.
7,043,841 B2 5/2006 Franzini et al.
7,770,294 B2 8/2010 Bruno et al.
8,037,609 B2 * 10/2011 Nicoll ..................... B26B 21/44 30/40
8,590,162 B2 11/2013 Park et al.
9,511,501 B2 12/2016 Carneiro et al.
9,956,698 B2 5/2018 Liberatore
9,999,981 B2 6/2018 Bunnell
10,369,711 B2 * 8/2019 Washington ........ B26B 21/4031
10,406,705 B2 9/2019 Liberatore
10,406,706 B2 9/2019 Liberatore
2002/0000040 A1 1/2002 Gilder
2002/0026721 A1 3/2002 Lee et al.
2002/0116822 A1 8/2002 Coffin
2003/0074798 A1 * 4/2003 Follo ..................... B26B 21/225 30/527
2003/0115762 A1 6/2003 Follo et al.
2004/0181953 A1 9/2004 Follo et al.
2005/0138814 A1 6/2005 Pennella et al.
2006/0080838 A1 * 4/2006 Johnson ................ B26B 21/222 30/50
2010/0251555 A1 10/2010 Park et al.
2011/0247216 A1 * 10/2011 Johnson .............. B26B 21/4012 30/41
2011/0247217 A1 * 10/2011 Johnson .................. B26B 21/44 30/50
2012/0317818 A1 12/2012 Oglesby et al.
2015/0314465 A1 11/2015 Giannopoulos et al.
2015/0328788 A1 11/2015 Ren et al.
2016/0129603 A1 * 5/2016 Antoniou .............. B26B 21/443 30/538
2017/0326744 A1 11/2017 Liberatore
2018/0272549 A1 9/2018 Son et al.
2018/0326606 A1 11/2018 Liberatore
2020/0070376 A1 3/2020 Petratou et al.

FOREIGN PATENT DOCUMENTS

GB 2116470 9/1983
JP 2003-093767 A 4/2003
JP 2009-539554 A 11/2009
JP 2010-527736 A 8/2010
JP 2011-152345 A 8/2011
KR 10-2000-0071144 A 11/2000
KR 10-2006-0126810 A 12/2006
KR 20-2014-0002069 U 4/2014
KR 10-2015-0095934 A 8/2016
WO WO 2006/065625 A1 6/2006
WO WO 2008/147133 A1 12/2008
WO WO 2014/094905 A1 6/2014

OTHER PUBLICATIONS

State Intellectual Property Office of the People's Republic of China Application Serial No. 201580084736.4 Office Action dated Dec. 16, 2019, in 3 pages.
International Search Report issued for corresponding International Patent Application No. PCT/KR2015/012521, mailed on Aug. 19, 2016.
Japan Patent Office Application No. 2018-526107 Office Action dated Mar. 15, 2019, in 10 pages.
European Patent Office Application Serial No. 15908856.6 Search Report dated Apr. 12, 2019, in 11 pages.
United States Patent and Trademark Office U.S. Appl. No. 15/983,677 Office Action dated Apr. 2, 2020, in 35 pages.
United States Patent and Trademark Office U.S. Appl. No. 15/983,677 Office Action dated May 21, 2020, in 16 pages.
United States Patent and Trademark Office U.S. Appl. No. 15/983,677 Final Office Action dated Nov. 16, 2020, in 18 pages.
United States Patent and Trademark Office U.S. Appl. No. 15/983,677 Advisory Action dated Feb. 2, 2021, in 5 pages.
United States Patent and Trademark Office U.S. Appl. No. 15/983,677 Office Action dated Apr. 14, 2021, in 12 pages.
United States Patent and Trademark Office U.S. Appl. No. 15/983,677 Final Office Action dated Oct. 15, 2021, in 11 pages.
United States Patent and Trademark Office U.S. Appl. No. 15/983,677 Office Action dated Feb. 15, 2022, in 10 pages.
United States Patent and Trademark Office U.S. Appl. No. 15/983,677 Notice of Allowance dated Jul. 5, 2022, in 10 pages.
http://www.merriam-webster.com/dictionary/protected.
KR 20-2014-0002069 English translation, Apr. 8, 2014, S-Moon Corporation.
Office Action dated Jun. 6, 2023 in U.S. Appl. No. 18/057,686.
Final Office Action dated Jan. 10, 2024 in U.S. Appl. No. 18/057,686.
Notice of Allowance dated Apr. 19, 2024 in U.S. Appl. No. 18/057,686.

* cited by examiner

HANDLE ASSEMBLY AND CARTRIDGE, AND RAZOR INCLUDING SAME

CROSS-REFERENCE TO RELATED APPLICATIONS

The present application is a continuation of U.S. patent application Ser. No. 18/057,686, filed Nov. 21, 2022, which is a continuation of U.S. patent application Ser. No. 15/983,677, filed May 18, 2018, now U.S. Pat. No. 11,504,865 issued Nov. 22, 2022, which is a continuation of international application PCT/KR2015/012521, filed Nov. 20, 2015, which claims priority to Korean Patent Application No. 10-2015-0162937 filed on Nov. 20, 2015 in the Korean Intellectual Property Office, the entire content of each of which is hereby incorporated by reference.

FIELD

The present disclosure relates to a handle assembly, a cartridge, and a razor including the handle assembly and the cartridge, and more particularly, a handle assembly to which a cartridge is coupled to be replaceable, the cartridge, and a razor including the handle assembly and the cartridge.

BACKGROUND

U.S. Pat. No. 5,787,586 discloses a razor 10 including a replaceable cartridge 14 and a handle 12 attachable to, or detachable from, the cartridge 14.

As disclosed in U.S. Pat. No. 5,787,586, the conventional razor handle 12 has a structure in which a plunger 44, which elastically supports the cartridge 14, protrudes.

PATENT LITERATURE (Patent Literature 1) U.S. Pat. No. 5,787,586

Since the conventional razor handle 12 has a structure in which the plunger 44 protrudes, the plunger 44 may often be damaged or broken by external impact or the like. If the plunger 44 is damaged, it may not be able to properly support the cartridge 14, and thus, the razor may no longer be usable.

To address the aforementioned problems, exemplary embodiments of the present disclosure provide a handle that is less likely to be damaged by external impact, a cartridge, and a razor including the handle and the cartridge.

However, objects of the present disclosure are not restricted to the one set forth herein. The above and other objects of the present disclosure will become more apparent to one of ordinary skill in the art to which the present disclosure pertains by referencing the detailed description of the present disclosure given below.

SUMMARY

A handle assembly according to an exemplary embodiment of the present disclosure comprises: a grip part gripped by a user; and a connecting part fixing the cartridge, wherein the connecting part comprises: a first plunger guard formed to protrude from the front end of the grip part; a second plunger guard formed to protrude from the front end of the grip part to be spaced apart from the first plunger guard; and a plunger slidably coupled between the first plunger guard and second plunger guard.

The plunger may slide between a first position at which a front end of the plunger is aligned with the front ends of the first plunger guard and second plunger guard and the second position at which the front end of the plunger is located at a rear of the front ends of the first plunger guard and second plunger guard.

The connecting part may further comprise an elastic member elastically supporting the plunger, and the plunger may be slid to the second position by an external force, and may return to the first position by the elastic force of the elastic member when an external force is removed.

A housing, which receives the connecting part so that the first plunger guard, the second plunger guard, and the front end of the plunger can be exposed, may be provided at the front end of the grip part, and the connecting part may further comprise an eject button slidably installed at a top of the housing and a pusher operating in synchronization with the eject button and releasing a coupling of the cartridge and the connecting part.

A front end of the pusher may be located below at least one of the plunger, the first plunger guard, and the second plunger guard.

The connecting part may further comprise an elastic member supported at one end by the plunger and supported at the other end by the pusher, and the elastic member may provide a first return force for moving forward the plunger moved backward by an external force and a second return force for moving backward the pusher moved forward by the external force and the eject button.

A cartridge according to an exemplary embodiment of the present disclosure comprises: at least one blade; a frame supporting the at least one blade so that the at least one blade can be exposed at the front; a plunger pressing protrusion formed to protrude from the frame toward a rear, formed to be outwardly convex, and including a bottom surface that is placed in contact with a plunger of a handle assembly; and a connector installed to be rotatable with respect to the frame and coupled to the handle assembly to be attachable to, or detachable from, the handle assembly.

The plunger pressing protrusion may have a vertically asymmetrical tapered shape.

The connector may comprise a receiving hole, which receives one end of the handle assembly, and a latch, which is formed to protrude into the receiving hole.

A razor according to an exemplary embodiment of the present disclosure comprises: a handle assembly, wherein the handle assembly comprises: a grip part gripped by a user; and a connecting part comprising a first plunger guard, which is formed to protrude from a front end of the grip part, a second plunger guard, which is formed to protrude from the front end of the grip part to be spaced apart from the first plunger guard, and a plunger, which is slidably coupled between the first plunger guard and the second plunger guard; and a cartridge, wherein the cartridge comprises: at least one blade; a frame supporting the at least one blade so that the at least one blade can be exposed at a front thereof; a connector installed to be rotatable with respect to the frame and comprising a receiving hole, which receives the first plunger guard, the second plunger guard, and the plunger; and a plunger pressing protrusion formed to protrude from the frame toward a rear and elastically supported by the plunger.

A bottom surface of the plunger pressing protrusion that is placed in contact with the plunger may have an outwardly convex taper shape.

The plunger may slide between a first position at which a front end of the plunger is aligned with front ends of the first plunger guard and second plunger guard and a second position at which the front end of the plunger is located at a rear of the front ends of the first plunger guard and second plunger guard, in a free state in which an external force is yet to be applied to the cartridge, the plunger may support the plunger pressing protrusion at the first position, and as the frame is rotated in one direction with respect to the connector by an external force, the plunger pressing protrusion may move the plunger to the second position.

The connecting part may further comprise an elastic member elastically supporting the plunger, and when the external force is removed, the plunger may return to the first position by the elastic force of the elastic member and may push the plunger pressing protrusion to rotate the frame in the other direction with respect to the connector.

At least one of the first plunger guard and second plunger guard may comprise a latching protrusion formed to protrude therebelow, and the connector may further comprise a latch formed on an inside of the receiving hole to protrude, supported by the latching protrusion, and maintaining a coupling of the cartridge and the handle.

The grip part may comprise a housing receiving the connecting part so that the first plunger guard, the second plunger guard, and the front end of the plunger can be exposed, the connecting part may further comprise an eject button slidably installed at the top of the housing and a pusher operating in synchronization with the eject button, and as the eject button is moved in one direction, the pusher may elastically deform the latch supported in the latching protrusion and may thus separate the latch from the latching protrusion.

The connecting part may further comprise an elastic member supported at one end by the plunger and supported at the other end by the pusher, and the elastic member provides a first return force for moving forward the plunger moved backward by an external force and a second return force for moving backward the pusher moved forward by the external force and the eject button.

Other features and exemplary embodiments may be apparent from the following detailed description, the drawings, and the claims.

Exemplary embodiments of the present disclosure provide the following effects.

Since plunger guards, which are for protecting a plunger, are provided on both sides of the plunger, the plunger can be protected even when a cartridge is disassembled.

Also, since a frame of the cartridge is elastically supported to be rotatable, an easy, safe shaving can be provided. Also, since the frame is maintained at a uniform home position, instead of freely moving, even after external impact is removed, a razor can be further safely used.

Also, the cartridge can be easily attached to, or detached from, a handle assembly.

The effects of the present disclosure are not limited to the above-described effects and other effects which are not described herein will become apparent to those skilled in the art from the following description.

BRIEF DESCRIPTION OF THE DRAWINGS

While the specification conclude with claims particularly pointing out and distinctly claiming the subject matter is regarded as forming the present disclosure, it is believed that the disclosure will be better understood from the following description taken in conjunction with the accompanying drawings.

DETAILED DESCRIPTION

Figure 1:
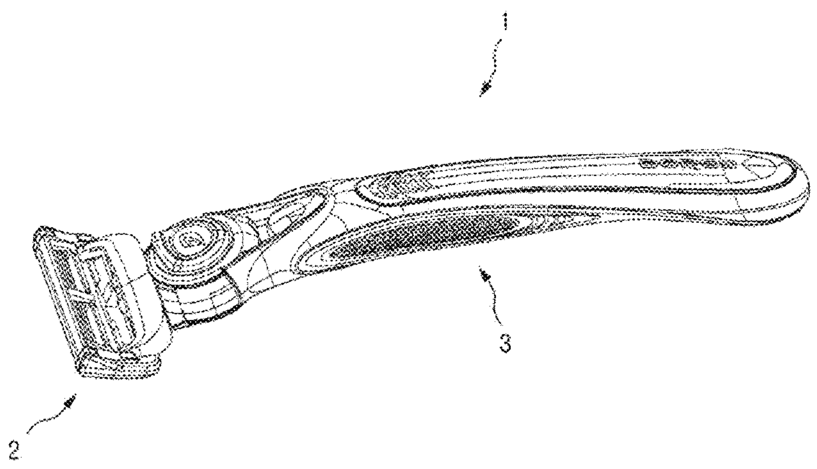
FIG. 1 is a perspective view of a razor according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different provides and should not be construed as being limited to the embodiments set forth herein. Rather, these embodiments are provided so that this disclosure will be thorough and complete and will fully convey the concept of the present disclosure to those skilled in the art, and the present disclosure will only be defined by the appended claims. Like reference numerals refer to like elements throughout the specification.

The drawings are schematic and not proportionally scaled down. Relative scales and ratios in the drawings are enlarged or reduced for the purpose of accuracy and convenience, and the scales are random and not limited thereto. In addition, like reference numerals designate like structures, elements, or parts throughout the specification.

Handle assemblies, cartridges, and razors including the handle assemblies and the cartridges according to exemplary embodiments of the present disclosure will hereinafter be described with reference to the accompanying drawings.

FIG. 1 is a perspective view of a razor according to an exemplary embodiment of the present disclosure.

As illustrated in FIG. 1, a razor 1 according to an exemplary embodiment of the present disclosure includes a cartridge 2 and a handle assembly 3. The cartridge 2 is coupled to the handle assembly 3 to be replaceable.

Figure 2:
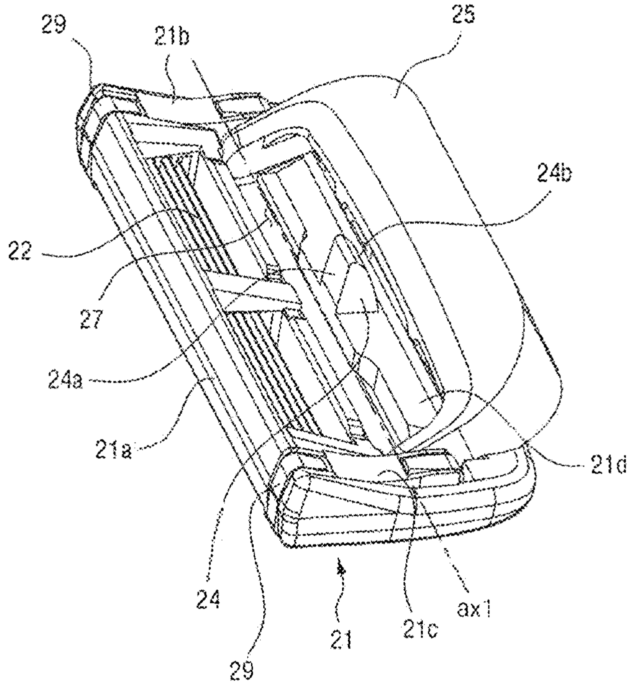
FIG. 2 is a perspective view of the razor according to an exemplary embodiment of the present disclosure.
Figure 3:
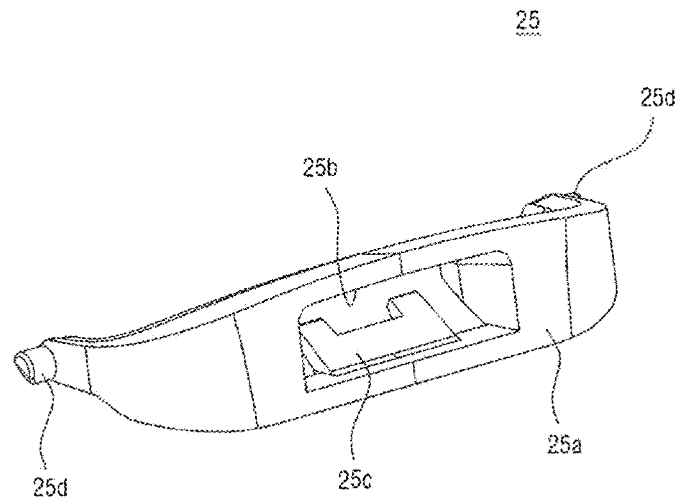
FIG. 3 is a perspective view of a connector of a cartridge according to an exemplary embodiment of the present disclosure.
Figure 4:
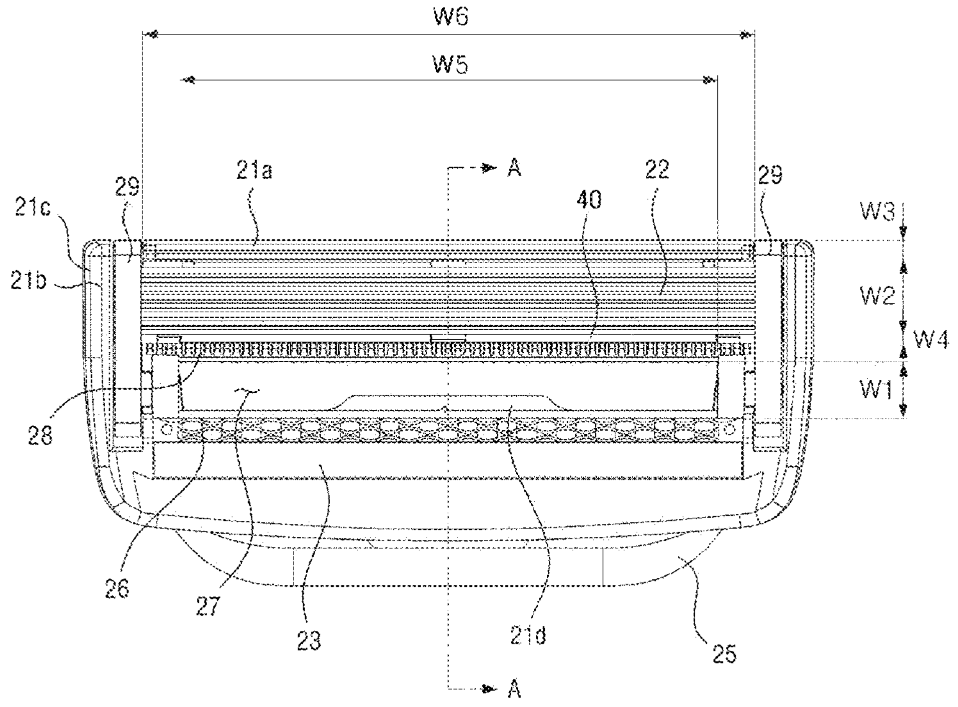
FIG. 4 is a front view of the cartridge according to an exemplary embodiment of the present disclosure.
Figure 5:
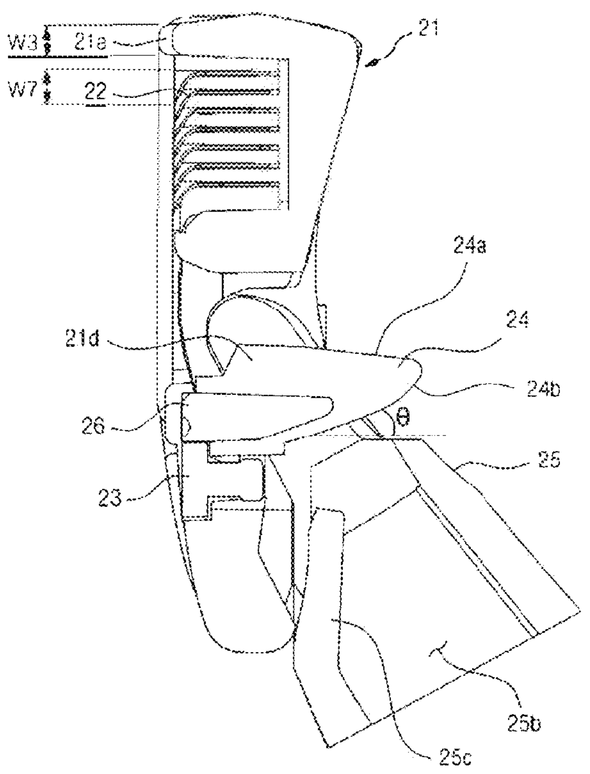
FIG. 5 is a cross-sectional view taken along line AA of FIG. 4.

FIG. 2 is a perspective view of the razor according to an exemplary embodiment of the present disclosure, FIG. 3 is a perspective view of a connector of a cartridge according to an exemplary embodiment of the present disclosure, FIG. 4 is a front view of the cartridge according to an exemplary embodiment of the present disclosure, and FIG. 5 is a cross-sectional view taken along line AA of FIG. 4.

As illustrated in FIG. 2, the cartridge 2 according to an exemplary embodiment of the present disclosure includes a plurality of blades 22, which shave hair, and a frame 21, which supports the blades 22.

The frame 21 has a substantially rectangular framework that is open at the front and the rear thereof. Specifically, the frame 21 includes first and second side frames 21*c* and 21*b* formed on left and right sides, respectively, of the frame 21, a lower frame 21*d* connecting the lower portions of the first and second side frames 21*c* and 21*b*, and an upper frame (not shown) connecting the upper portions of the first and second side frames 21*c* and 21*b*. As illustrated in FIG. 2, a top cap 21*a* may be mounted on the upper frame. The top cap 21*a* may be formed of a different material or color from the frame 21 to improve the esthetics of the cartridge 2 or to improve the rigidity of the frame 21. For example, in order to improve the esthetics of the cartridge 2, the frame 21 may be formed of a non-glossy material, and the top cap 21*a* may be formed of a glossy material. In another example, in order to improve the rigidity of the frame 21, the frame 21 may be formed of a plastic material, and the top cap 21*a* may be formed of a metal material.

The blades 22 may be installed in such a manner that edge portions thereof can be exposed at the front of the frame 21 in a state where both ends of the blades are respectively supported on both sides by the first and second side frames 21*c* and 21*b*. As illustrated in FIGS. 2 and 4, the blades 22 may be fixed to the first and second side frames 21*c* and 21*b* by clips 29, which penetrate the first and second side frames 21*c* and 21*b*.

As illustrated in FIG. 2, a plunger pressing protrusion 24 is formed at the center of the lower frame 21*d* to protrude in a rearward direction.

As illustrated in FIG. 5, the plunger pressing protrusion 24 may have a vertically asymmetrical tapered shape.

A top surface 24*a* of the plunger pressing protrusion 24 may be formed to extend from a top portion of the lower frame 21*d* and may be substantially flat or may be curved or flat with a less steep slope than a bottom surface 24*b*.

The bottom surface 24*b* of the plunger pressing protrusion 24, which is the surface where the cartridge 2 is placed in contact with a plunger 260 in a state of being coupled to the handle assembly 3, may have a curved surface that is outwardly convex. The curved surface of the bottom surface 24*b* may be configured to only have a positive slope θ or to have a slope greater than 0.

The bottom surface 24*b* includes the curved surface whose slope θ increases closer to the rear end of the bottom surface 24*b*. Thus, the rear end where the top surface 24*a* and the bottom surface 24*b* are close to each other may be formed closer to the top surface 24*a* than to the bottom surface 24*b*.

Since the plunger pressing protrusion 24 has a vertically asymmetrical taper shape, the vertical height of the plunger pressing protrusion 24 may not be uniform, and the length by which the plunger pressing protrusion 24 protrudes in the rearward direction from the lower frame 21*d* may be greater than the maximum vertical height of the plunger pressing protrusion 24. FIG. 2 illustrates that the plunger pressing protrusion 24 is formed at the lower frame 21*d*. However, in another exemplary embodiment, the cartridge 2 may further include a supporting bar formed between the upper frame and the lower frame 21*d*, and the plunger pressing protrusion 24 may be formed to protrude in the rearward direction from the supporting bar. In this exemplary embodiment, the supporting bar may be formed to connect the first and second side frames 21*c* and 21*b* and to be substantially parallel to the upper frame or the lower frame 21*d*, or may be formed to connect the upper frame and the lower frame 21*d* and to be substantially parallel to the first or second side frame 21*c* or 21*b*.

In the meantime, as illustrated in FIG. 4, a lubrication band 23, a guard rubber 26, and a comb guard 28 are provided at the front of the cartridge 2.

The lubrication band 23 expands upon contact with water and provides a water-soluble material including a lubricating component, a soothing component, and the like. Accordingly, during shaving, the lubricating component and the soothing component are supplied to the skin that is in contact with the cartridge 2, thereby guaranteeing smooth movement in a state of being in contact with the skin surface of the cartridge 2 and calming the skin.

The guard rubber 26 pulls the skin that is in contact with the cartridge 2, and thus induces the blades 22 to effectively shave hair.

The comb guard 28 aligns hair entering the blades 22.

As illustrated in FIG. 4, an opening 27 may be formed between the comb guard 28 and the guard rubber 26. The opening 27 enhances shaving performance by forming part of the skin to convexly protrude and inducing hair to be cut in a state of standing upright.

As illustrated in FIG. 2, the cartridge 2 includes a connector 25, which is installed to be rotatable with respect to the frame 21.

As illustrated in FIG. 3, the connector 25 includes a connector body 25*a*, which is substantially U-shaped, and bosses 25*d*, which are formed on both sides of the connector body 25*a* to protrude.

The bosses 25*d* are coupled to the frame 21 so that the connector body 25*a* can be rotatably supported with respect to the frame 21. Boss holes (not illustrated), into which the bosses 25*d* are inserted, may be provided at the frame 21.

As illustrated in FIG. 3, a receiving hole 25*b*, which penetrates the connector body 25*a*, is formed at the center of the connector body 25*a*. The connector 25 further includes a latch 25*c*, which extends from the connector body 25*a* to protrude into the receiving hole 25*b*.

The receiving hole 25*b* is a space into which a first plunger guard 235, a second plunger guard 236, and the plunger 260 of the handle assembly 3 that will all be described later are introduced when the cartridge 2 is coupled to the handle assembly 3, and is also a space in which the first plunger guard 235, the second plunger guard 236, and the plunger 260 are maintained with the cartridge 2 coupled to the handle assembly 3.

The latch 25*c* supports the first and second plunger guards 235 and 236 with the cartridge 2 coupled to the handle assembly 3 and maintains the first and second plunger guards 235 and 236 in the receiving hole 25*b* so that the cartridge 2 cannot be detached from the handle assembly 3.

The latch 25*c*, which is an elastically deformable element, is elastically deformed by a pusher 240 of the handle assembly 3 that will be described later, when the cartridge 2 is detached from the handle assembly 3, and releases the support of the first and second plunger guards 235 and 236. This will be described later in detail.

Figure 6:
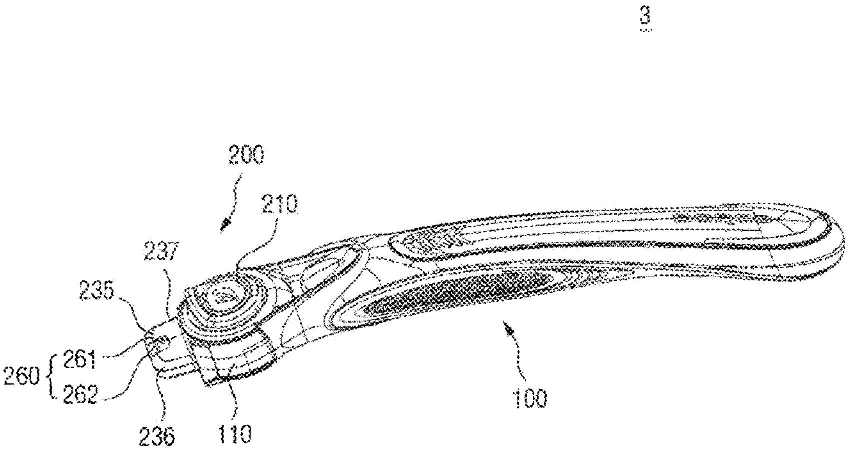
FIG. 6 is a perspective view of a handle assembly according to an exemplary embodiment of the present disclosure.

FIG. 6 is a perspective view of a handle assembly according to an exemplary embodiment of the present disclosure.

As illustrated in FIG. 6, the handle assembly 3 according to an exemplary embodiment of the present disclosure includes a grip part 100 and a connecting part 200.

The grip part 100 is a part gripped by the hand of a user during the use of the razor, and the connecting part 200 is a part connected to the above-described cartridge 2.

A housing 110, which supports the connecting part 200, is provided at one end of the grip part 100. As illustrated in FIG. 6, the connecting part 200 is received in the housing 110 so that an eject button 210, the first plunger guard 235, the second plunger guard 236, and the front end of the plunger 260 can be exposed on the outside of the housing 110.

The eject button 210 performs a switch function for separating the cartridge 2 from the grip part 100, and the first plunger guard 235, the second plunger guard 236, and the plunger 260 perform the function of coupling/supporting the cartridge 2 and the handle assembly 3.

The connecting part 200 of the handle assembly 3 according to an exemplary embodiment of the present disclosure will hereinafter be described in detail.

Figure 7:
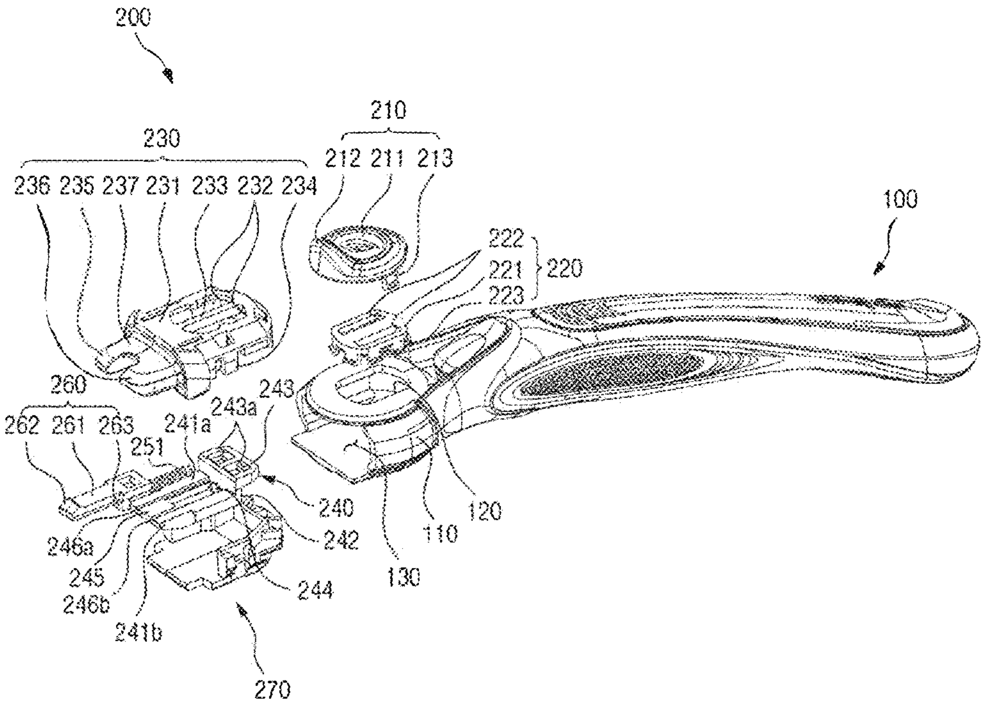
FIG. 7 is an exploded perspective view of the handle assembly according to an exemplary embodiment of the present disclosure.

FIG. 7 is an exploded perspective view of the handle assembly according to an exemplary embodiment of the present disclosure.

As illustrated in FIG. 7, the housing 110, which is formed at the end of the grip part 100, includes an open installation space 130, in which an upper case 230 and a lower case 270 of the connecting part 200 are inserted and installed. A through hole 120 for block installation, which is coupled to an eject button supporting block 220, is formed at the top surface of the housing 110.

In the meantime, the connecting part 200 includes the eject button 210, the eject button supporting block 220, the upper case 230, the pusher 240, an elastic member 251, the plunger 260, and the lower case 270.

As illustrated in FIG. 7, the eject button 210 includes a base plate 211, a protruding end 212, and a first hook end 213.

The eject button 210 is a button for use when the user desires to detach the cartridge 2 from the handle assembly 3. The user can separate the cartridge 2 by pushing the eject button 210 toward the cartridge while pressing the base plate 211. A structure for, and the operation of, detaching the cartridge 2 using the eject button 210 will be described later.

Since the user generally uses the eject button 210 while pressing the base plate 211 with the thumb, the base plate 211 may have a circular shape corresponding to the area of the first node of the thumb. However, the shape of the base plate 211 may vary depending on the design, ease of use, and the like.

The protruding end 212 is formed to protrude from the end of the top surface of the base plate 211. The protruding end 212 supports the finger tip of the user that moves the eject button 210 while pressing the base plate 211, and can thus allow the user to move the eject button 210 easily.

The first hook end 213 is formed to protrude from the bottom surface of the base plate 211. The first hook end 213 is inserted into a first hook end coupling hole 243*a* of the pusher 240 and thus fixes the eject button 210 to the pusher 240. The eject button 210 is hook-coupled to the pusher 240 with the eject button supporting block 220, the top surface of the housing 110, and the upper case 230 interposed therebetween.

The eject button supporting block 220 includes a block body 221 and a second hook end 223.

The base plate 211 of the eject button 210 is seated on the top surface of the block body 221. As illustrated in FIG. 7, a slot 222, through which the first hook end 213 of the eject button 210 passes, is formed at the block body 221. The slot 222 guides the moving distance and direction of the eject button 210 by being elongated by a predetermined length in one direction so that the first hook end 213 is movable therealong.

In the meantime, the second hook end 223 is formed to protrude downwardly from the block body 221. The second hook end 223 is inserted into a second hook end coupling hole 232 of the upper case 230 and thus fixes the eject button supporting block 220 to the upper case 230. Accordingly, an operating button supporting block 220 remains fixed when the eject button 210 moves forward and backward.

As illustrated in FIG. 7, the upper case 230 includes an upper case body 231 and a third hook end 234.

The second hook end coupling hole 232, into which the second hook end 223 of the eject button supporting block 220 is inserted, is formed at the upper case body 231. A crossbar 233, which passes through the center of the second hook end coupling hole 232, is formed at the second hook end coupling hole 232.

The crossbar 233 supports a part of the lower end of the block body 221 so that the eject button supporting block 220 can be disposed on the top surface of the upper case body 231 without passing through the second hook end coupling hole 232. Thus, the eject button supporting block 220 can be fixed to the upper case 230 by the second hook end 223 while being supported by the supporting bar 223.

The third hook end 234 is formed to protrude in a downward direction from a outer periphery of the upper case body 231. The third hook end 234 is coupled to the outer periphery of the lower case 270 and thus couples the upper case 230 and the lower case 270.

The upper case 230 and the lower case 270 form a space in which the pusher 240, the elastic member 251, and the plunger 260 that will be described later can be installed in a state where the upper case 230 and the lower case 270 are coupled.

As illustrated in FIG. 7, the first plunger guard 235, the second plunger guard 236, and a guard base 237 are provided at the front end of the upper case body 231.

The guard base 237 is formed to extend from the front end of the upper case body 231 in a forward direction. Also, the first plunger guard 235 is formed to extend from one side of the front end of the guard base 237 in the forward direction. Also, the second plunger guard 236 is formed to extend from the other side of the front end of the guard base 237 in the forward direction and thus to be a predetermined distance apart from the first plunger guard 235.

A front end 262 of the plunger 260 that will be described later is disposed in the space between the first and second plunger guards 235 and 236.

In the meantime, the pusher 240 is installed between the upper case 230 and the lower case 270 to be slidable forward and backward. As illustrated in FIG. 7, the pusher 240 includes a push arm 241, a supporting wall 242, a first hook end supporting plate 243, and a first hook end coupling hole 243*a*.

The push arm (241*a*, 241*b*) is formed to extend from the supporting wall 242 in the forward direction (or a direction toward the cartridge 2). The first hook end supporting plate 243 is formed to extend from the supporting wall 242 in the rearward direction (or a direction toward the grip part 100. The first hook end coupling hole 243*a* is formed to vertically penetrate the first hook end supporting plate 243.

As described above, the first hook end 213 of the eject button 210 is inserted into the first hook end coupling hole 243*a* and is thus coupled to the first hook end supporting plate 243. Accordingly, the pusher 240 may operate in synchronization with the eject button 210. That is, as the eject button 210 moves forward and backward, the pusher 240 can move along with the eject button 210.

A first coupling protrusion 244, at which the rear end of the elastic member 251 is fixedly installed, is formed at the supporting wall 242.

As illustrated in FIG. 7, the push arm (241*a*, 241*b*) may include a pair of arms 241*a* and 241*b*, which are spaced apart from each other and are parallel to each other. The elastic member 251 and a guide protrusion 263 of the plunger 260 that will be described later are disposed in the space between the pair of arms 241*a* and 241*b*. The pair of arms 241*a* and 241*b* are disposed on both sides of the guide protrusion 263 of the plunger 260 and thus guide the moving direction and distance of the plunger 260.

A plunger stopper 245, which blocks the space between the pair of arms 241*a* and 241*b*, is provided at the front ends of the pair of arms 241*a* and 241*b*. The plunger stopper 245 prevents the plunger 260 from being separated from the upper case 230 and the lower case 270 by preventing the guide protrusion 263 from moving further forward, and at the same time, determines a forward movement limit position of the plunger 260.

Guide lanes 246*a* and 246*b* may be formed on both sides of the plunger stopper 245. The guide lanes 246*a* and 246*b* guide the moving direction of the pusher 240, and guide protrusions (not illustrated), which are inserted into the guide lanes 246*a* and 246*b*, may be formed at the first and second plunger guards 235 and 236.

In the meantime, the plunger 260 includes a plunger body 261 and the guide protrusion 263.

As illustrated in FIG. 7, the plunger body 261 may have a long bar shape extending substantially in the forward and backward directions. The front end 262 of the plunger body 261 may be formed to have a curvature similar to the front end of the plunger guard 236.

The guide protrusion 263 is formed to protrude from the bottom surface of the plunger body 261 in the downward direction by a predetermined length. As described above, the guide protrusion 263 is slidably disposed between the pair of push arms 241*a* and 241*b*. A second engaging protrusion 264, at which the front end of the elastic member 251 is fixedly installed, is formed on the rear surface of the guide protrusion 263 (see FIG. 9).

Accordingly, the plunger 260 and the pusher 240 are elastically supported by the elastic member 251.

The front end 262 of the plunger body 261 of the plunger 260 moves between the first and second plunger guards 235 and 236. If the front end 262 of the plunger body 261 of the plunger 260 retreats toward the guard base 237 by an external force and then the external force is removed, the front end 262 of the plunger body 261 of the plunger 260 returns to the front ends of the first and second plunger guards 235 and 236 by the elastic force of the elastic member 251.

That is, the plunger 260 slides between a first position (see FIGS. 6 and 9) at which the front end 262 of the plunger body 261 is substantially aligned with the front ends of the first and second plunger guards 235 and 236 and a second position (see FIG. 11) at which the front end 262 of the plunger body 261 is located at the rear of the front ends of the first and second plunger guards 235 and 236.

When there is no external force, the plunger 260 has the first position as its home position. When an external force is applied, the plunger 260 may move from the first position to the second position. Then, when the external force is removed at the second position, the plunger 260 automatically returns to the first position by the elastic force of the elastic member 251. The first position may be determined such that the forward movement of the guide protrusion 263 can be prevented by the plunger stopper 245.

Also, the pusher 240 is elastically supported by the elastic member 251 and moves forward according to the operation of the eject button 210 by an external force. When the external force is removed, the pusher 240 retreats by the elastic force of the elastic member 251.

As illustrated in 6, the handle assembly 3 according to an exemplary embodiment of the present disclosure is configured such that the plunger 260 can be protected by the first and second plunger guards 235 and 236. Thus, the plunger 260 can be effectively protected from external impact or the like.

Figure 8:
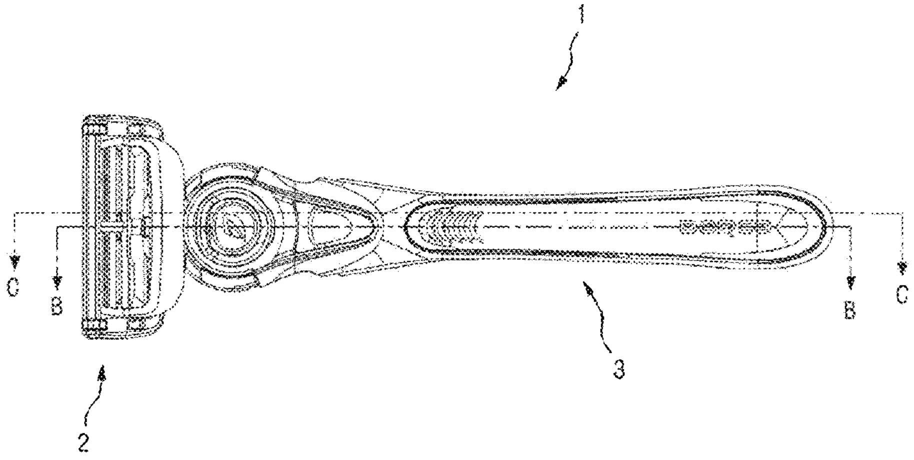
FIG. 8 is a plan view of a razor according to an exemplary embodiment of the present disclosure.
Figure 9:
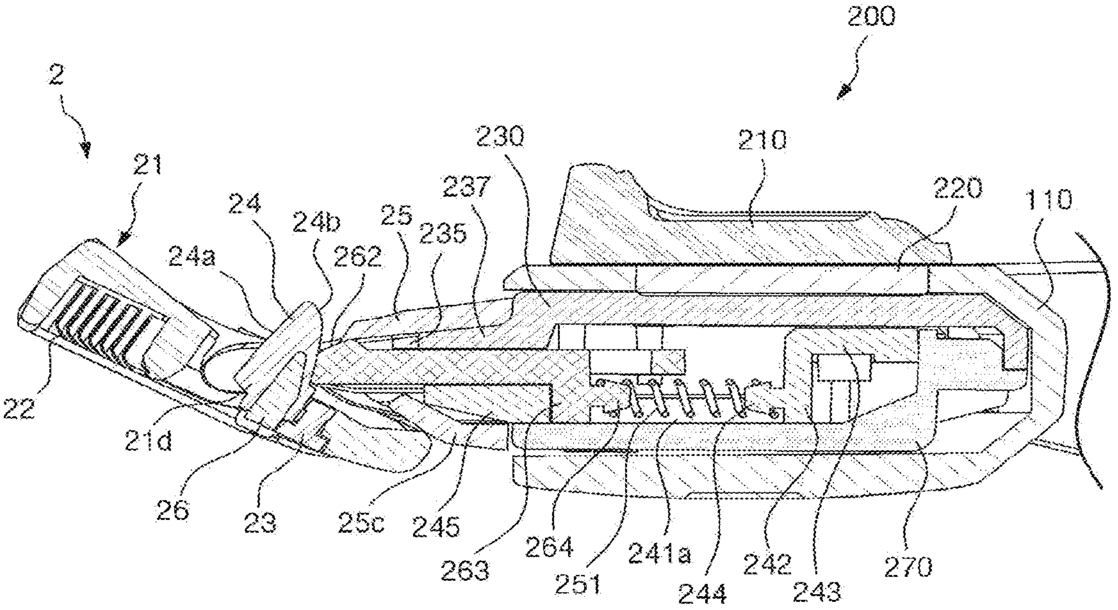
FIG. 9 is a cross-sectional view taken along line BB of FIG. 8.
Figure 10:
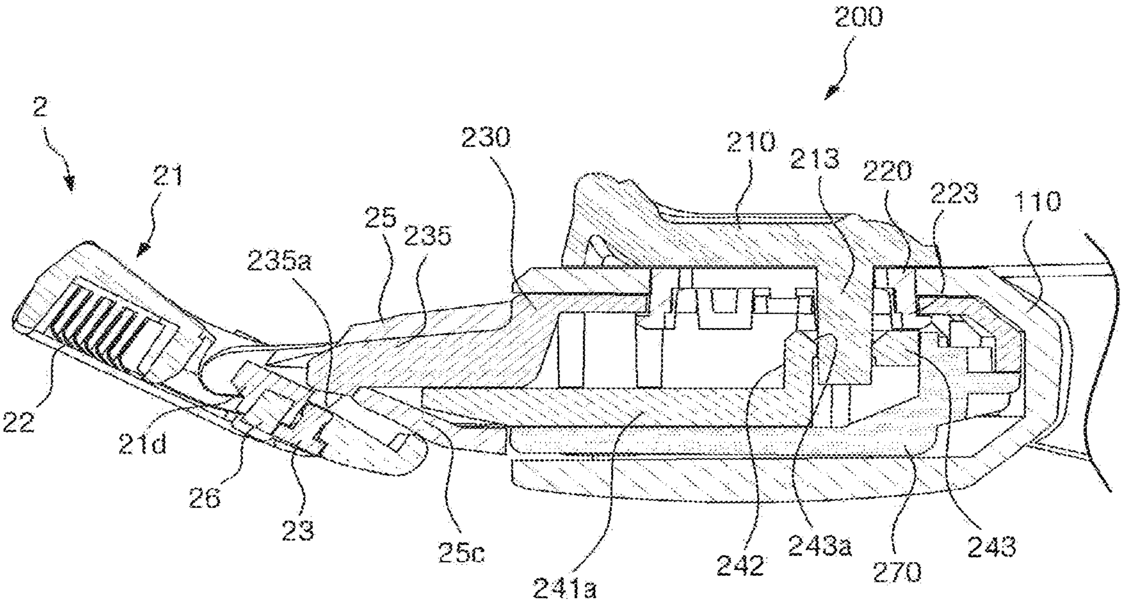
FIG. 10 is a cross-sectional view taken along line CC of FIG. 8.

FIG. 8 is a plan view of a razor according to an exemplary embodiment of the present disclosure, FIG. 9 is a cross-sectional view taken along line BB of FIG. 8, and FIG. 10 is a cross-sectional view taken along line CC of FIG. 8.

As illustrated in FIG. 9, the front end 262 of the plunger 260 is placed in contact with the bottom surface 24*b* of the plunger pressing protrusion 24. The plunger 260 may be located at the first position by the elastic force of the elastic member 251.

That is, as illustrated in FIG. 9, the guide protrusion 263 of the plunger 260 is elastically supported by the elastic member 251 and is thus maintained to be in contact with the plunger stopper 245.

As illustrated in FIG. 10, the pusher 240 may be elastically supported by the elastic member 251 and may thus be maintained to be in contact with the inner side of the lower case 270.

As illustrated in FIG. 10, the first hook end 213 of the eject button 210 is inserted into the first hook end coupling hole 243*a* of the pusher 240 and is thus coupled to the first hook end supporting plate 243.

FIGS. 9 and 10 illustrate a state in which an external force is yet to be applied to the razor 1 after the coupling of the cartridge 2 to the handle assembly 3, and the position of the pusher 240, the eject button 210, and the plunger 260 may become the home position.

In the meantime, as illustrated in FIG. 10, a latching protrusion 235*a*, in which the latch 25*c* is received, is formed on a bottom portion of the first plunger guard 235 the second plunger guard 236.

During the coupling of the cartridge 2 to the handle assembly 3, the latch 25*c* is elastically deformed by being pressed down along the lower portions of the front ends of the first and second plunger guards 235 and 236 while the first and second plunger guards 235 and 236 are being introduced into the receiving hole 25*b*. Then, as soon as passing through the latching protrusion 235*a*, the latch 25*c* is lifted up at the end thereof and is engaged with the latching protrusion 235*a*. As a result, the cartridge 2 is coupled to the handle assembly 3 so as not to be detached from the handle assembly 3.

Also, as illustrated in FIGS. 9 and 10, the latch 25*c* is formed to protrude from the connector body 25*a* toward the frame 21 to form an upward inclination. Accordingly, once the latch 25*c* is engaged with the latching protrusion 235*a*, the latch 25*c* cannot be easily separated from the latching protrusion 235*a* even if an external force is applied in a direction in which the cartridge 2 and the handle assembly 3 are separated from each other. Rather, the latching protrusion 235*a* lifts the latch 25*c* to prevent the latch 25*c* from being separated therefrom.

Figure 11:
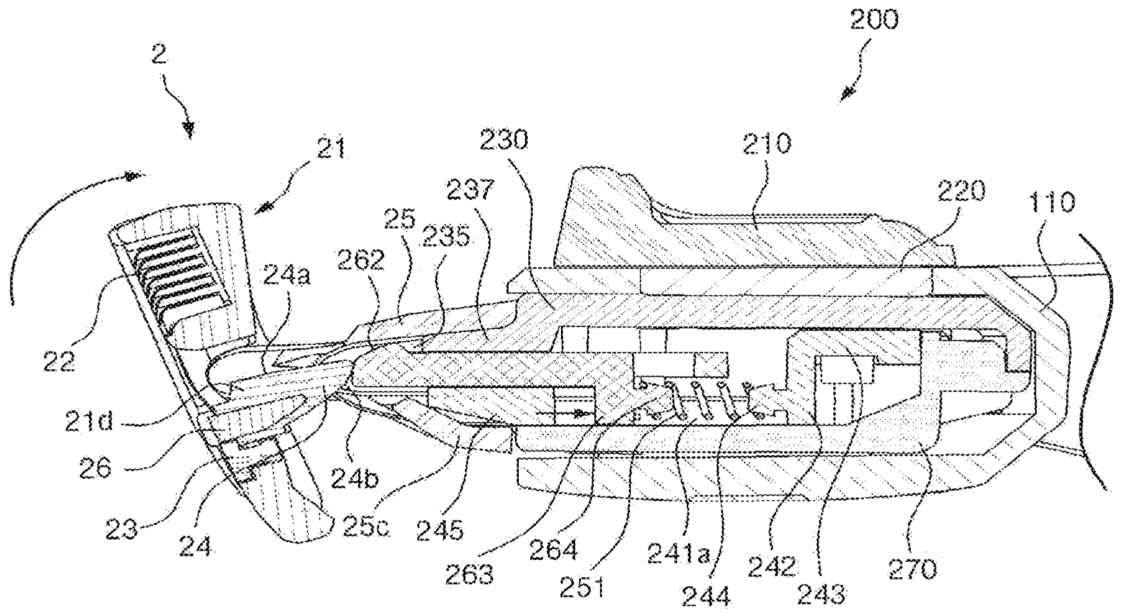
FIG. 11 is a view illustrating the inter-operational relationship between a plunger pressing protrusion and a plunger in accordance with the rotation of a cartridge.

FIG. 11 is a view illustrating the inter-operational relationship between a plunger pressing protrusion and a plunger in accordance with the rotation of a cartridge.

The cartridge 2 according to the present exemplary embodiment is installed so as for the connector 25 to be rotatable with respect to the frame 21. Thus, as illustrated in FIG. 11, when the user uses the razor 1 in which the cartridge 2 is coupled to the handle assembly 3, the frame 21 can be used while being rotated with respect to the handle assembly 3 by an external force.

As the frame 21 is rotated in one direction with respect to the handle assembly 3, the plunger pressing protrusion 24 fixed to the frame 21 is also rotated along with the frame 21.

Also, as the plunger pressing protrusion 24 is rotated, the plunger 260 retreats to the second position while sliding along the bottom surface 24*b* of the plunger pressing protrusion 24. Since the plunger 260 is elastically supported by the elastic member 251, the front end 262 of the plunger 260 can be continuously maintained to be in contact with the bottom surface 24*b* of the plunger pressing protrusion 24, even if the plunger pressing protrusion 24 is rotated.

Thereafter, if the external force that rotates the cartridge 2 is removed, the plunger 260 moves forward by the elastic force of the elastic member 251 and thus returns to the first position. As the plunger 260 returns to the first position, the plunger pressing protrusion 24 and the frame 21 are rotated in the other direction and thus return to the home position (the state illustrated in FIG. 9). That is, the elastic force of the elastic member 251 is used as a return force (or a first return force) not only for allowing the plunger 260 to return to the first position, but also for allowing the frame 21 to return to the home position.

Since the bottom surface 24*b* of the plunger pressing protrusion 24 that is maintained to be in contact with the plunger 260 forms an outwardly convex curved surface, the cartridge 2 can be smoothly rotated. The curvature of the bottom surface 24*b* of the plunger pressing protrusion 24 can be variously selected depending on the rotation range and the rotational motion of the cartridge 2.

The razor according to the present exemplary embodiment elastically supports the frame 21 of the cartridge 2 to be rotatable, hair can be shaved with the blades 22 placed in close contact with the body along with the user's body contour. As a result, an easier, safer shaving can be possible.

Also, when an external force is removed, the frame 21 of the cartridge 2 uniformly maintains its home position without freely moving. Thus, the razor 1 can be used more safely.

Figure 12:
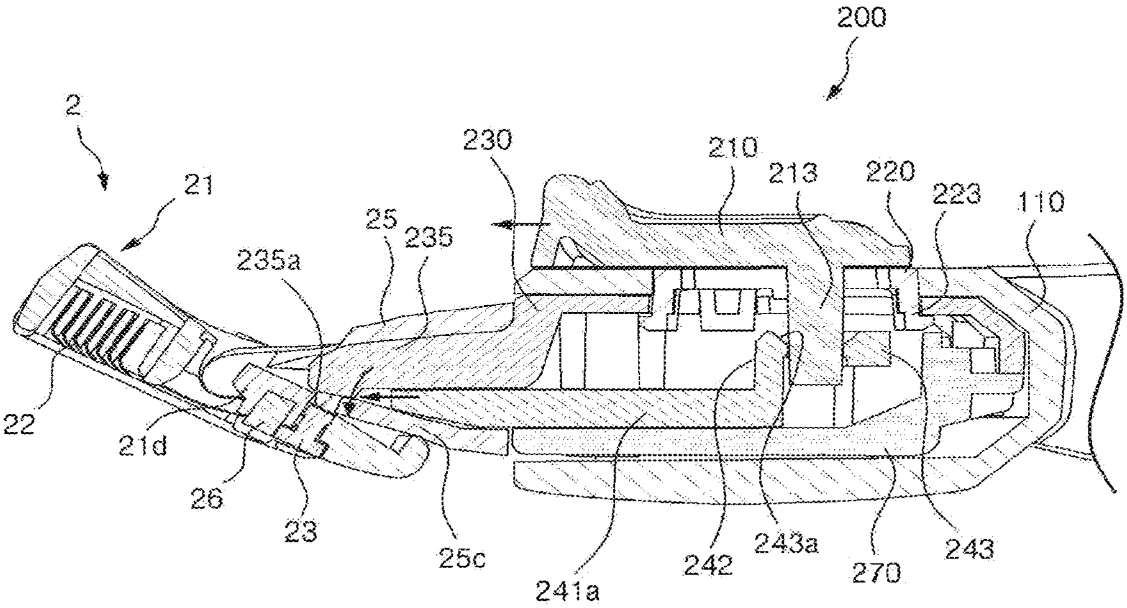
FIG. 12 is a view illustrating the inter-operational relationship between an eject button, a pusher, and a latch for detaching a cartridge.

FIG. 12 is a view illustrating the inter-operational relationship between an eject button, a pusher, and a latch for detaching a cartridge.

As illustrated in FIG. 12, the cartridge 2 may be separated from the handle assembly 3 by moving the eject button 210 forward (or in the direction toward the cartridge) by a predetermined distance.

Specifically, as the user moves the eject button 210 forward by a predetermined distance, the pusher 240 is moved forward along with the eject button 210.

As the pusher 240 is moved forward, the push arm (241*a*, 241*b*) is moved forward and thus elastically deforms the latch 25*c* so as to detach the latch 25*c* from the latching protrusion 235*a*.

As the latch 25*c* is detached from the latching protrusion 235*a*, the first and second plunger guards 235 and 236 become detachable from the cartridge 2, and as a result, the cartridge 2 can be separated from the handle assembly 3.

Thereafter, when the external force that moves the eject button 210 forward is removed, the pusher 240 is moved backward by the elastic force of the elastic member 251, and the eject button 210 is moved to the home position (the state illustrated in FIG. 10). That is, the elastic force of the elastic member 251 is used as a return force (or a second return force) for allowing the pusher 240 and the eject button 210 to return to the home position.

A handle assembly 3 according to another exemplary embodiment of the present disclosure will hereinafter be described. For convenience of description, the same reference numerals are used for elements similar to those from the above-described previous exemplary embodiment, and descriptions of elements that the present exemplary embodiment has in common with the previous exemplary embodiment will be omitted.

Figure 13:
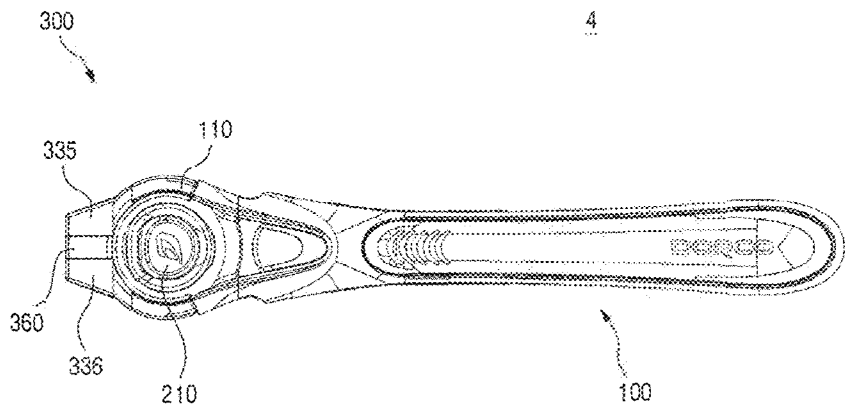
FIG. 13 is a plan view of a handle assembly according to another exemplary embodiment of the present disclosure.
Figure 14:
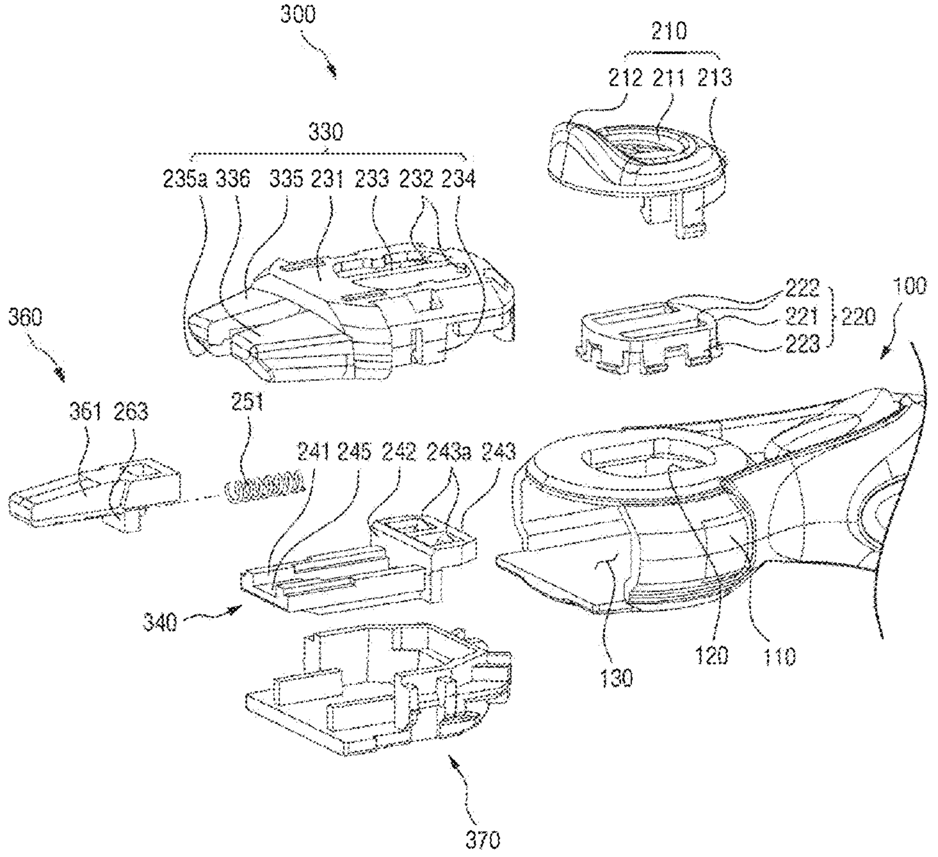
FIG. 14 is an exploded perspective view of the handle assembly according to another exemplary embodiment of the present disclosure.

FIG. 13 is a plan view of a handle assembly according to another exemplary embodiment of the present disclosure, and FIG. 14 is an exploded perspective view of the handle assembly according to another exemplary embodiment of the present disclosure.

As illustrated in FIGS. 13 and 14, in a handle assembly 4 according to the present exemplary embodiment, unlike in that of the previous exemplary embodiment, a guard base 237 is omitted from an upper case 330, and first and second plunger guards 335 and 336 are formed to extend from the front end of an upper case body 231.

The first and second plunger guards 335 and 336 have a taper shape whose width gradually decreases closer to the front. Accordingly, the first and second plunger guards 335 and 336 can be easily introduced into a receiving hole 25*b* of a cartridge 2, and as a result, the cartridge 2 can be easily assembled to the handle assembly 4.

The front end and the top surface of a plunger body 361 of a plunger 360 may be formed to have a angle of inclination and curvature similar to the front ends and the top surfaces of the first and second plunger guards 335 and 336.

Thus, when the plunger 360 is located at a first position, the first plunger guard 335, the plunger 360, and the second plunger guard 336 may appear as a single body, as illustrated in FIG. 13.

While exemplary embodiments of the present disclosure are described above, it is not intended that these exemplary embodiments describe all possible forms of the present disclosure. Rather, the words used in the specification are words of description rather than limitation, and it is understood that various changes may be made without departing from the spirit and scope of the inventive concept of the present disclosure. Additionally, the features of various implementing embodiments may be combined to form further embodiments of the inventive concept of the present disclosure.

A razor according to an exemplary embodiment of the present disclosure comprises: a handle assembly, wherein the handle assembly comprises: a grip part gripped by a user; and a connecting part comprising a first plunger guard, which is formed to protrude from the front end of the grip part, a second plunger guard, which is formed to protrude from the front end of the grip part to be spaced apart from the first plunger guard, and a plunger, which is slidably coupled between the first and second plunger guards; and a cartridge, wherein the cartridge comprises: at least one blade; a frame supporting the blade so that the blade can be exposed at the front thereof; a connector installed to be rotatable with respect to the frame and comprising a receiving hole, which receives the first plunger guard, the second plunger guard, and the plunger; and a plunger pressing protrusion formed to protrude from the frame toward the rear and elastically supported by the plunger.

A cartridge according to an exemplary embodiment of the present disclosure comprises: at least one blade; a frame supporting the blade so that the blade can be exposed at the front; a plunger pressing protrusion formed to protrude from the frame toward the rear, formed to be outwardly convex, and including a bottom surface that is placed in contact with a plunger of a handle assembly; and a connector installed to be rotatable with respect to the frame and coupled to the handle assembly to be attachable to, or detachable from, the handle assembly.

A razor according to an exemplary embodiment of the present disclosure comprises: a handle assembly, wherein the handle assembly comprises: a grip part gripped by a user; and a connecting part comprising a first plunger guard, which is formed to protrude from the front end of the grip part, a second plunger guard, which is formed to protrude from the front end of the grip part to be spaced apart from the first plunger guard, and a plunger, which is slidably coupled between the first and second plunger guards; and a cartridge, wherein the cartridge comprises: at least one blade; a frame supporting the blade so that the blade can be exposed at the front thereof; a connector installed to be rotatable with respect to the frame and comprising a receiving hole, which receives the first plunger guard, the second plunger guard, and the plunger; and a plunger pressing protrusion formed to protrude from the frame toward the rear and elastically supported by the plunger.

What is claimed is:

1. A cartridge configured to be coupled to a handle assembly and rotatable with respect to the handle assembly, the cartridge comprising:
- one or more blades;
- a frame configured to support and expose the one or more blades at an upper portion of the frame and, the frame configured to receive the one or more blades in a longitudinal direction;
- a first guard member positioned on the upper portion of the frame, the first guard member positioned in front of the one or more blades and spaced apart from all of the one or more blades;
- a second guard member positioned in front of the first guard member;
- a first opening positioned between the first guard member and the second guard member on the upper portion of the frame and extending through the frame from the upper portion of the frame to a lower portion of the frame; and
- a protrusion formed at the lower portion of the frame, and wherein:
  - the one or more blades, a second opening, the first guard member, the first opening, and the second guard member are positioned sequentially as listed on the upper portion of the frame in a lateral direction perpendicular to the longitudinal direction,
  - a width of the first opening, exposed when viewed from the upper portion of the frame, in the lateral direction is greater than a width of the first guard member in the lateral direction,
  - the width of the first opening in the lateral direction is greater than a width of the second opening in the lateral direction,
  - the first guard member and the second guard member are both exposed at the upper portion of the frame and directly contact at least one of skin or hair during shaving,
  - the second guard member is immovably fixed to the frame,
  - a width of the first guard member in the longitudinal direction is greater than a width of the first opening in the longitudinal direction, and
  - at least a portion of the protrusion is disposed to overlap in the lateral direction with at least a portion of the first opening when viewed from the upper portion of the frame.

2. The cartridge of claim 1, wherein the cartridge further comprises: a top cap disposed behind the one or more blades, and
wherein the width of the first opening in the lateral direction is greater than a width of the top cap in the lateral direction.

3. The cartridge of claim 2, wherein the one or more blades comprise at least five blades disposed between the top cap and the first guard member.

4. The cartridge of claim 2, wherein all of the one or more blades are disposed between the top cap and the first guard member.

5. The cartridge of claim 1, wherein the cartridge further comprises:
the second opening positioned between a foremost blade of the one or more blades and the first guard member.

6. The cartridge of claim 1, wherein a pivot axis overlaps the first opening when viewed from the upper portion of the frame.

7. The cartridge of claim 1, wherein a portion of the protrusion overlapping at least the portion of the first opening in the lateral direction is spaced apart from a front end of the first opening in a direction from the upper portion to the lower portion of the frame.

8. The cartridge of claim 1, wherein a bottom surface of the protrusion is configured to contact with a portion of the handle assembly.

9. The cartridge of claim 1, wherein a protruding end of the protrusion is the lowest point on the lower portion of the frame.

10. The cartridge of claim 1, wherein a top surface of the protrusion extending from the lower portion of the frame is flat, wherein a bottom surface of the protrusion is angled relative to the top surface, and wherein the bottom surface is curved.

11. The cartridge of claim 1, wherein the first opening is configured to enable skin to protrude and enable at least a portion of hair to stand upright.

* * * * *